US010909023B2

(12) United States Patent
Liu et al.

(10) Patent No.: US 10,909,023 B2
(45) Date of Patent: *Feb. 2, 2021

(54) FUNCTION-MESSAGE ORIENTED TEST CASE GENERATION FOR SUPPORTING CONTINUOUS GLOBALIZATION VERIFICATION TESTING

(71) Applicant: International Business Machines Corporation, Armonk, NY (US)

(72) Inventors: Su Liu, Austin, TX (US); Debbie Anglin, Williamson, TX (US); Fan Yang, Beijing (CN); Boyi Tzen, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/846,954

(22) Filed: Apr. 13, 2020

(65) Prior Publication Data
US 2020/0242005 A1 Jul. 30, 2020

Related U.S. Application Data

(63) Continuation of application No. 16/110,037, filed on Aug. 23, 2018, now Pat. No. 10,698,793.

(51) Int. Cl.
*G06F 11/36* (2006.01)

(52) U.S. Cl.
CPC .............................. *G06F 11/3636* (2013.01)

(58) Field of Classification Search
CPC ............. G06F 11/3466; G06F 11/3636; G06F 11/3664; G06F 11/3676
See application file for complete search history.

(56) References Cited

U.S. PATENT DOCUMENTS 5,263,162 A 11/1993 Lundeby
7,752,501 B2 7/2010 Bak
(Continued)

FOREIGN PATENT DOCUMENTS

CN 105912461 A 8/2016

OTHER PUBLICATIONS

KA Mckethan, G White, "Demystifying software globalization", Apr. 2005, vol. 9, No. 2.*
(Continued)

*Primary Examiner* — Wei Y Zhen
*Assistant Examiner* — Amir Soltanzadeh
(74) *Attorney, Agent, or Firm* — Cantor Colburn LLP; David Quinn

(57) ABSTRACT

One or more embodiments are described for function-message identifier oriented test case generation for seamlessly supporting continuous globalization verification testing in agile computer program product development. An example computer-implemented method includes identifying a newly added globalization function in a modified source code, the globalization function including a message to be output via a user-interface, the message being in a first language. The method also includes generating function-message data that associates a function identifier of the globalization function with a message identifier of the message. The method also includes generating, automatically, a test case for verifying the globalization function outputs the message via the user-interface in a second language using the function-message data. The method also includes creating and broadcasting a test report to a development team, the test report indicating a result of executing the test case.

18 Claims, 10 Drawing Sheets

(56) References Cited

U.S. PATENT DOCUMENTS

| | | | |
|---|---|---|---|
| 7,793,156 | B2 | 9/2010 | Tsurumi et al. |
| 7,904,595 | B2 | 3/2011 | Cheng et al. |
| 8,001,532 | B1 | 8/2011 | Jakubiak |
| 8,161,498 | B2 | 4/2012 | Atkin et al. |
| 8,180,659 | B2 | 5/2012 | Atkin et al. |
| 8,392,872 | B2 | 3/2013 | Bak et al. |
| 9,009,100 | B2 | 4/2015 | Rechterman et al. |
| 9,032,361 | B2 | 5/2015 | Dhalait |
| 9,183,123 | B2 | 11/2015 | Spektor et al. |
| 9,514,426 | B2 | 12/2016 | Cherusseri et al. |
| 9,558,102 | B2 | 1/2017 | Schultz et al. |
| 9,767,011 | B2 | 9/2017 | Fan et al. |
| 10,095,600 | B2 * | 10/2018 | Fan .................. G06F 9/454 |
| 10,698,793 | B2 * | 6/2020 | Liu .................. G06F 11/3636 |
| 2005/0028145 | A1 | 2/2005 | Kang |
| 2008/0127103 | A1 | 5/2008 | Bak |
| 2009/0007077 | A1 | 1/2009 | Musuvathi |
| 2009/0031170 | A1 * | 1/2009 | Tsurumi .............. G06F 11/3692 714/38.14 |
| 2009/0106764 | A1 | 4/2009 | Klementiev et al. |
| 2010/0005341 | A1 | 1/2010 | Agarwal et al. |
| 2010/0064178 | A1 * | 3/2010 | Dhulipalla .......... G06F 11/3688 714/38.14 |
| 2011/0074574 | A1 | 3/2011 | Becker et al. |
| 2013/0007588 | A1 * | 1/2013 | Guo .................. G06F 11/3688 715/234 |
| 2013/0254752 | A1 * | 9/2013 | Nair .................. G06F 9/454 717/137 |
| 2015/0026121 | A1 | 1/2015 | Shani et al. |
| 2016/0321574 | A1 | 11/2016 | Peterson |
| 2016/0350692 | A1 | 12/2016 | Doganata et al. |
| 2017/0039121 | A1 | 2/2017 | Liu et al. |
| 2017/0153970 | A1 * | 6/2017 | Fan .................. G06F 11/3688 |
| 2017/0153971 | A1 * | 6/2017 | Fan .................. G06F 11/3692 |
| 2017/0371631 | A1 * | 12/2017 | Haiderzaidi ........... G06F 9/454 |
| 2017/0371763 | A1 * | 12/2017 | Haiderzaidi ........... G06F 9/454 |
| 2017/0371764 | A1 * | 12/2017 | Haiderzaidi ........... G06F 9/454 |
| 2018/0032428 | A1 | 2/2018 | Gundeti |
| 2018/0101464 | A1 | 4/2018 | Fan et al. |
| 2020/0065228 | A1 | 2/2020 | Liu et al. |

OTHER PUBLICATIONS

Asnes, Adam; "Implementing Continuous Globalization in the Enterprise"; Lingoport Suite Extensive Services Training, dated Dec. 2, 2015; Retrieved on Aug. 20, 2018; 30 Pages.

http://sprint.ly/;"Human-machine Visualization Interfaces and Processes for Providing Real Time or Near Real Time Actionable Information Relative to One or More Elements of One or More Networks, Networks, and Systems of Networks Don't ask how projects are going"; Retrieved: Sep. 18, 2018; Dated: 2018; 7 pages.

https://www.cognizant.com/whitepapers/Jumpstarting-DevOps-with-Continuous-Testing-codex1719.pdf; "Jumpstarting DevOps with Continuous Testing"; Retrieved: Sep. 18, 2018; Dated: Dec. 2015; 9 pages.

Liu, Su; "Concept of Cloud Based Globalization Verification Service"; 40th Internationalization & Unicode Conference, Santa Clara, CA, USA, dated 2016; Retrieved on Aug. 20, 2018; 19 pages.

Parasoft Automated Software Testing, Technical Whitepaper; "Continuous Testing for DevOps Evolving Beyond Simply Automtion"; dated 2017; Retrieved Aug. 20, 2018; 10 pages.

Pragseth, Pal; "Drive Continuous Testing With Service Vitualization"; CA Confidential, dated Jun. 2017; retrieved Aug. 20, 2018; 30 Pages.

List of IBM Patents or Patent Applications Treated as Related; Date Filed: Apr. 14, 2020, 2 pages.

* cited by examiner

FUNCTION-MESSAGE ORIENTED TEST CASE GENERATION FOR SUPPORTING CONTINUOUS GLOBALIZATION VERIFICATION TESTING

DOMESTIC PRIORITY

This application is a continuation of U.S. patent application Ser. No. 16/110,037, filed Aug. 23, 2018, the disclosure of which is incorporated by reference herein in its entirety.

BACKGROUND

The present invention relates to test automation system, and particularly to dynamic generation of test case(s) for seamlessly supporting continuous globalization verification testing, particularly for agile based computer program development systems. The present application relates to computing technology, and more specifically, to improving the efficiency of developing computer systems.

Computing is a global industry, where 92% of the world population resides in non-English speaking countries, and 73% of internet users are non-English speaking users. Further, 73% of the world's gross domestic product is accounted for by the non-English speaking countries. Accordingly, it is critical that organizations in the computing industry develop products and solutions that are consumable worldwide, and that the products are enabled to address unique language, cultural and business needs of global clients. Facilitating developers with tools for globalization (referred to as 'G11N'; "g" followed by 11 more letters, followed by "n") of computer program products, and further, automated tools to verify that the globalization tools have been applied in a compliant manner is a technical problem that needs to be addressed.

SUMMARY

According to one or more embodiments of the present invention, a computer-implemented method for function-message identifier oriented test case generation for seamlessly supporting continuous globalization verification testing in agile computer program product development, the method including identifying a newly added globalization function in a modified source code, the globalization function including a message to be output via a user-interface, the message being in a first language. The computer-implemented method also includes generating function-message data that associates a function identifier of the globalization function with a message identifier of the message. The computer-implemented method also includes generating, automatically, a test case for verifying the globalization function outputs the message via the user-interface in a second language using the function-message data. The computer-implemented method also includes creating and broadcasting a test report to a development team, the test report indicating a result of executing the test case.

According to one or more embodiments of the present invention, a system includes a memory device, and a processor coupled with the memory device. The processor performs a method for function-message identifier oriented test case generation for seamlessly supporting continuous globalization verification testing in agile computer program product development, the method including identifying a newly added globalization function in a modified source code, the globalization function including a message to be output via a user-interface, the message being in a first language. The method further includes generating function-message data that associates a function identifier of the globalization function with a message identifier of the message. The method further includes generating, automatically, a test case for verifying that the globalization function outputs the message via the user-interface in a second language using the function-message data. The method further includes creating and broadcasting a test report to a development team, the test report indicating a result of executing the test case.

According to one or more embodiments of the present invention, a computer program product includes a computer readable storage medium having stored thereon program instructions executable by one or more processing devices to perform a method for function-message identifier oriented test case generation for seamlessly supporting continuous globalization verification testing in agile computer program product development, the method including identifying a newly added globalization function in a modified source code, the globalization function including a message to be output via a user-interface, the message being in a first language. The method further includes generating function-message data that associates a function identifier of the globalization function with a message identifier of the message. The method further includes generating, automatically, a test case for verifying that the globalization function outputs the message via the user-interface in a second language using the function-message data. The method further includes creating and broadcasting a test report to a development team, the test report indicating a result of executing the test case.

According to one or more embodiments of the present invention, a system includes a source code repository, a message repository, and a globalization verification test system coupled with the source code repository and the message repository. The globalization verification test system generates a function-message identifier oriented test case for seamlessly supporting continuous globalization verification testing in agile computer program product development. Generating the function-message identifier oriented test case includes identifying a newly added globalization function in a source code added in the source code repository, the globalization function including a message to be output via a user-interface, the message being in a first language. Further, the test case generation includes generating a function-message data that associates a function identifier of the globalization function with a message identifier of the message. Further, the test case generation includes storing the message in the first language in the message repository and replacing the message in the source code with the message identifier. Further, the test case generation includes generating, automatically, the function-message identifier oriented test case for verifying that the globalization function outputs the message via the user-interface in a second language using the function-message data. Further, the test case generation includes creating and broadcasting a test report to a development team, the test report indicating a result of executing the function-message identifier oriented test case.

According to one or more embodiments of the present invention, a computer-implemented method includes identifying a newly added globalization function in a source code added in a source code repository, the globalization function including a message to be output via a user-interface, the message being in a first language. The computer-implemented method also includes generating a function-message data that associates a function identifier of the globalization function with a message identifier of the message. The computer-implemented method also includes storing the message in the first language in a message repository and replacing the message in the source code with the message identifier. The computer-implemented method also includes generating, automatically, a test case for verifying that the globalization function outputs the message via the user-interface in a second language using the function-message data. The computer-implemented method also includes creating and broadcasting a test report to a development team, the test report indicating a result of executing the test case.

In one or more examples, the function-message data further includes a source code filename, a function name, and a line number in the source code filename at which source code for the globalization function begins in the source code filename. In one or more examples, the globalization function includes a plurality of messages, and the method further includes aggregating the function-message data for each of the plurality of messages in a predetermined data structure.

In one or more examples, the predetermined data structure includes a function name, the message identifier, a message path, a message buffer name, a message content in the first language, a message content in the second language, and a testing locale environment. In one or more examples, the message content in the second language is obtained using a machine translation and a pseudo-translation. In one or more examples, the test case is generated using un-compiled source code. In one or more examples, the test case is generated using compiled source code. In one or more examples, the newly added globalization function is identified in the modified source code based on a globalization specification sheet of the agile computer program product.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
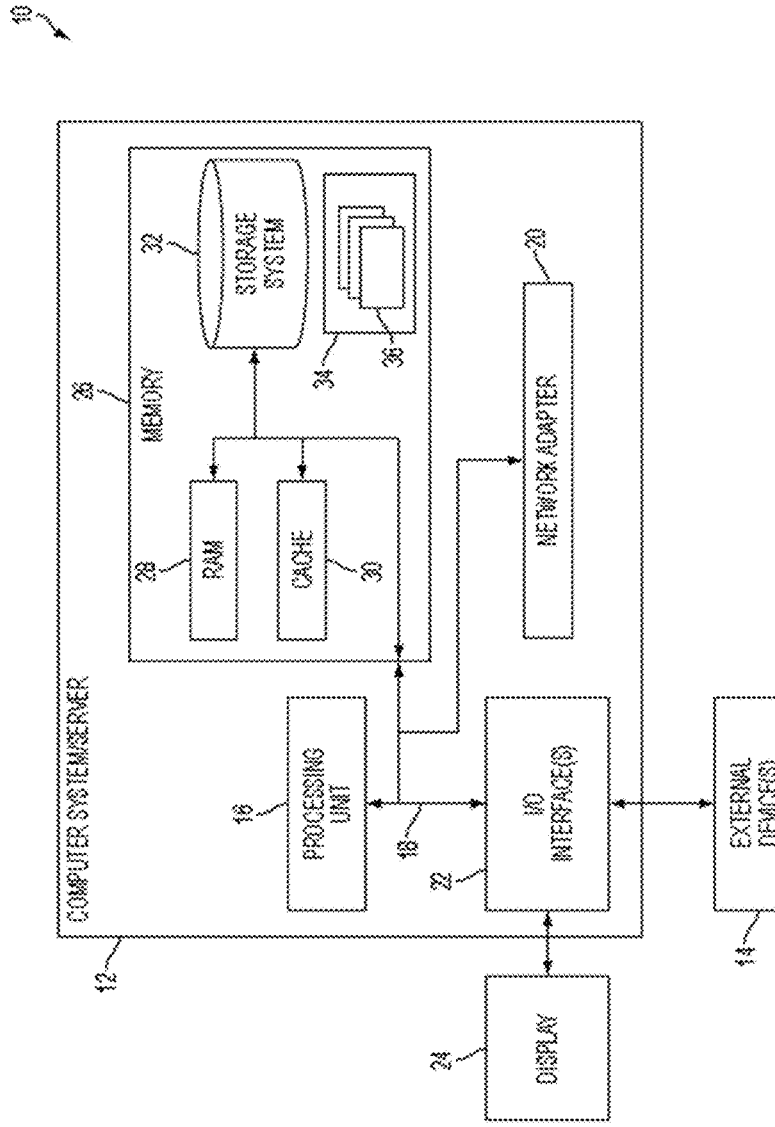
FIG. 1 depicts a cloud computing node according to one or more embodiments of the present invention.

Described herein are technical solutions for automated Globalization Enablement Development (GED) and real-time Globalization Verification Test (GVT) on computer program development operations (DevOps). "DevOps" is a software engineering practice for unifying software development (Dev) and software operation (Ops) using automation and monitoring at all steps of software construction, from integration, testing, releasing to deployment and infrastructure management. DevOps facilitates shorter software development cycles, increased deployment frequency, and more dependable releases, thus improving quality of the computer program. In one or more examples, the technical solutions facilitate improvement at each iteration (or sprint) of an "agile" process that may be used for the computer program development. Accordingly, the efficiency of the software development process itself is improved. The technical solutions described herein, accordingly are directed towards and rooted in computing technology.

In one or more examples, the technical solutions facilitate real-time translatability error prevention based on globalization code reasoning analysis, source code semantic examination (semantic globalization enablement code search, translatability error similarity comparison), and globalization specification verification. For example, the technical solutions include detecting hardcoded errors during GED stage for enhancing the quality of GED on development operations. To this end, the technical solutions include function-message ID oriented test case generation for seamlessly supporting continuous globalization verification testing in DevOps. By using the function-message ID oriented test case generation, globalization verification test (e.g. multilingual message handling verification, or translatability test) can be split, launched, analyzed, and completed in each sprint of the development process. By using the one or more embodiments of the present invention, agile based development teams can seamlessly adopt globalization message verification as part of the DevOps development.

To this end, the technical solutions include verifying, in real time, globalization enablement of newly developed code by comparing translatability features of the new code to design specifications and predetermined globalization specifications. For example, the technical solutions may include applying translatability reasoning analysis to checked-in source code change providing real-time translatability violation warning message to developers who are tracking translatability issues and problems. As such, the technical solutions are rooted in and/or tied to computer technology in order to overcome a problem specifically arising in the realm of computers, specifically software and computing system development, particularly compliant with globalization specifications.

Program Integrated Information (PII) is a modern standard globalization enablement approach used for string (or text) information displayed in a user interface, such as a graphical user interface (GUI). In computer program products that use PII, one or more of the strings to be displayed in the GUI are stored in external file(s) and these strings from the external file(s) are translated separately, typically without context. A Translation Verification Test (TVT), which is performed with the computer program product in operation, is used for finding an inappropriate translation(s) of a string in the computer program product. It is intrinsically difficult for a TVT to determine whether a string is hardcoded.

The technical solutions described herein are based on software development operations (such as DevOps) that recognize an increasing overlap between the globalization enablement development and globalization verification test functions, and which use PII for translation of text in the computer program product. For example, DevOps can be characterized by continuous deployment, delivery, and verification of software, along with agile globalization enablement development. In one or more examples, a portion of a software product's suite of globalization verification test cases are included in DevOps to facilitate the globalization enablement development function. The suite of globalization verification test cases may be packaged with the enterprise globalization enablement software product and shipped to a customer for use as real-time diagnostics.

However, typically in product development, such as in software development, globalization enablement work is error prone. Typically, developers add messages (such as help, usage, warning, error, status) into source code as hardcoded message strings. The examples herein consider that the hardcoded strings are in English, however, it is understood that in other examples the hardcoded strings may be in some other language, such as Chinese, Korean, Russian, and the like. Further yet, development tools such as GUI based development tools may mislead developers to add hardcoded strings (e.g. usage message, menu name, button names etc.) in the source code.

Such hardcoded strings embedded within the source code of a computer program product cause technical problems when the computer program product is executed by a user who is not a native speaker of the languages in which the hardcoded messages are written. For example, the hardcoded strings cause translatability problems because a hardcoded message cannot be translated at runtime. For example, a recent study indicates that ⅓ of the total translation verification test errors during development of computer program products are problems caused by hardcoded strings in the source code of the computer program products.

Computer programs, such as enterprise level software suites can include a large number (thousands or more) of such strings/messages. Globalization Verification Test (GVT) techniques facilitate verifying and testing the massive messages in different translated languages. For example, message verification in GVT is used to discover possible technical problems like if a message file exists for a given language the system supports; if the message file is readable; if the file is properly formatted so that it can be parsed to obtain all message ID and text string pairs correctly; if the file can be compiled, loaded and invoked properly.

However, in existing techniques, GVT is a bottleneck in the DevOps process because developers may not have time to generate a test case for each new feature that is added. Further, the developer may not have time to translate new messages in each sprint. Further, in one or more examples, test conditions and environment limitations can prevent testing one or more messages, for example, a particular processing system such as power9 not being available.

The technical solutions described herein address such technical problems by providing a continuous GVT in DevOps. According to one or more embodiments of the present invention, a function-message id oriented test cases are generated as described in detail further.

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 26, and a bus 18 that couples various system components including system memory 26 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 26 can include computer system readable media in the form of volatile memory, such as random access memory (RAM) 28 and/or cache memory 30. Computer system/server 12 may further include other removable/non-removable, volatile/non-volatile computer system storage media. By way of example only, storage system 32 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 26 may include at least one program product having a set (e.g., at least one) of program modules that are configured to carry out the functions of embodiments of the invention.

Program/utility 34, having a set (at least one) of program modules 36, may be stored in memory 26 by way of example, and not limitation, as well as an operating system, one or more application programs, other program modules, and program data. Each of the operating system, one or more application programs, other program modules, and program data or some combination thereof may include an implementation of a networking environment. Program modules 36 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
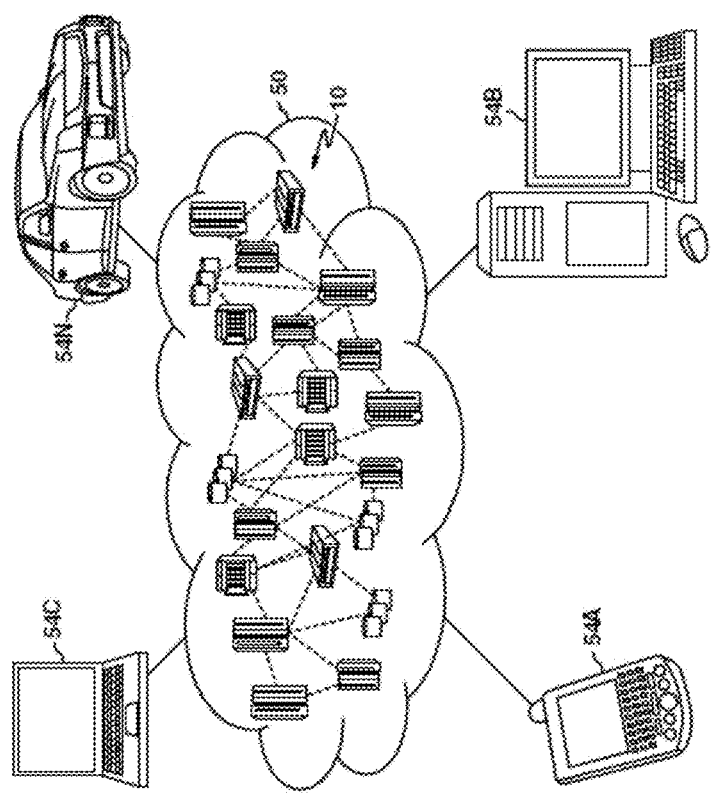
FIG. 2 depicts a cloud computing environment according to one or more embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
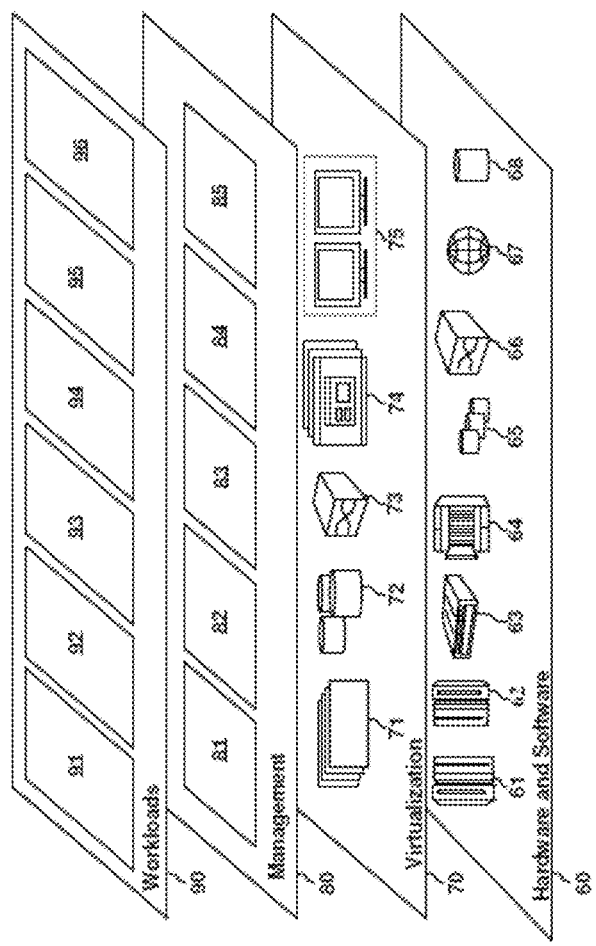
FIG. 3 depicts abstraction model layers according to one or more embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and globalization verification test 96.

Figure 4:
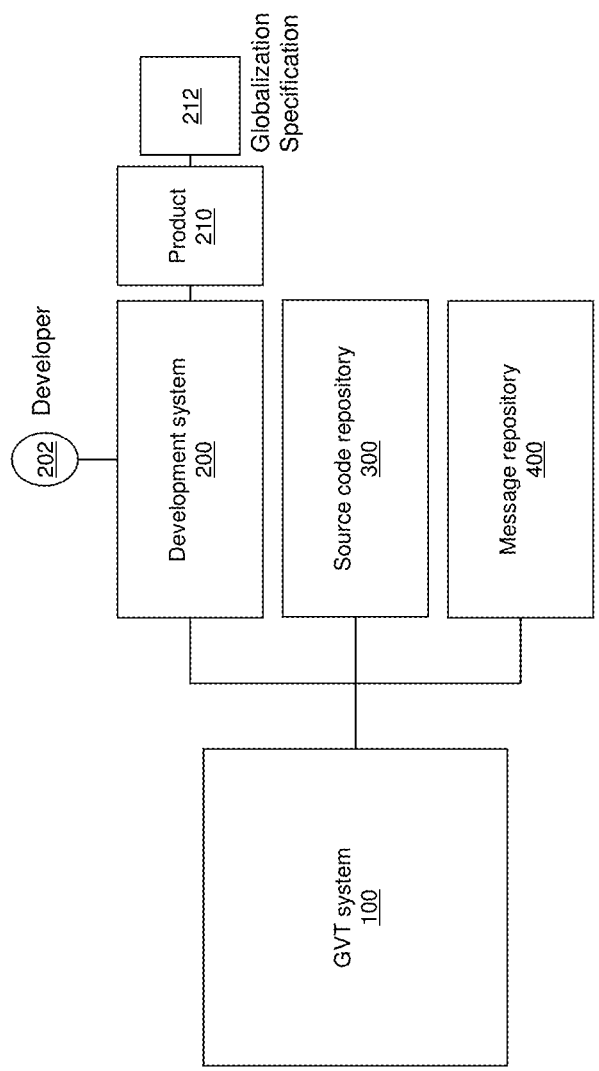
FIG. 4 depicts an example block diagram of a system for function-message oriented test case generation for supporting continuous globalization verification testing in DevOps according to one or more embodiments of the present invention.

FIG. 4 depicts an example block diagram for an example system 100 for supporting continuous globalization verification testing in DevOps according to one or more embodiments of the present invention. The system 100 facilitates function-message oriented test case generation. The system 100 communicates with a development system 200, such as an integrated development environment (IDE) being used for developing the computer program product 210. The development system 200 can be any IDE, such as ECLIPSE™, VISUAL STUDIO™, and the like.

The computer program product 210 can support multiple languages, such as English, French, Spanish, Russian, Korean, Simplified Chinese, Japanese, Portuguese, and the like. In one or more examples, one or more locales for the one or more of the languages can also be supported. For example, in English, the computer program product 210 can support US English and UK English. A globalization specification sheet 212 that is associated with the computer program product 210 indicates the different languages and locales that are supported. Alternatively, or in addition, a design specification of the computer program product 210 indicates the supported languages and locales.

A development team 202 uses the development system 200 to develop the computer program product 210. The development team 202 can include one or more members, referred to as a developer, and can include programmers, technical writers, program managers, project managers, test engineers, user interface developers, and other personnel responsible for one or more other functional roles.

Further, the system 100 communicates with a source code repository 300 that stores the computer executable instructions for the computer program product 210. The source code repository 300 can be part of code hosting servers such as GITHUB™, JAZZ™, and the like. The source code repository 300 is a database for saving and managing source code for the computer program code 210.

Further, the system 100 communicates with a message repository 400 that stores one or more messages that are included in the source code of the computer program product 210. The message repository 400 is part of the source code repository 300, in one or more examples. The message repository 400 is a database for saving and managing one or more messages in the source code of the computer program product 210, which includes a primary message and corresponding translated versions. For example, the primary message is written in English, with translated versions in various other languages supported by the computer program product 210. The translated versions convey the same meaning as the primary message. One of the primary message and the translated versions are loaded and displayed to the correlated natural language interface by a globalization translation enablement features dynamically during runtime of the computer program product 210.

For example, the message repository 400 stores multiple translations of each message in the various languages that are supported by the computer program product 210. Each message has a unique messageID, which can be shared among the translated copies of that message.

The communication can be wired and/or wireless. The one or more systems depicted can be a computing device, such as a desktop computer, laptop computer, computer server or any other computing device (FIG. 1). Further, it is understood that although each system is depicted by a single block, the system can include more than one devices, such as a server cluster. Further, it is understood that although the systems are depicted with separate blocks, one or more systems can be part of a common computing device. For example, the source code repository 300 and the message repository can be hosted by the same computer server.

Figure 5:
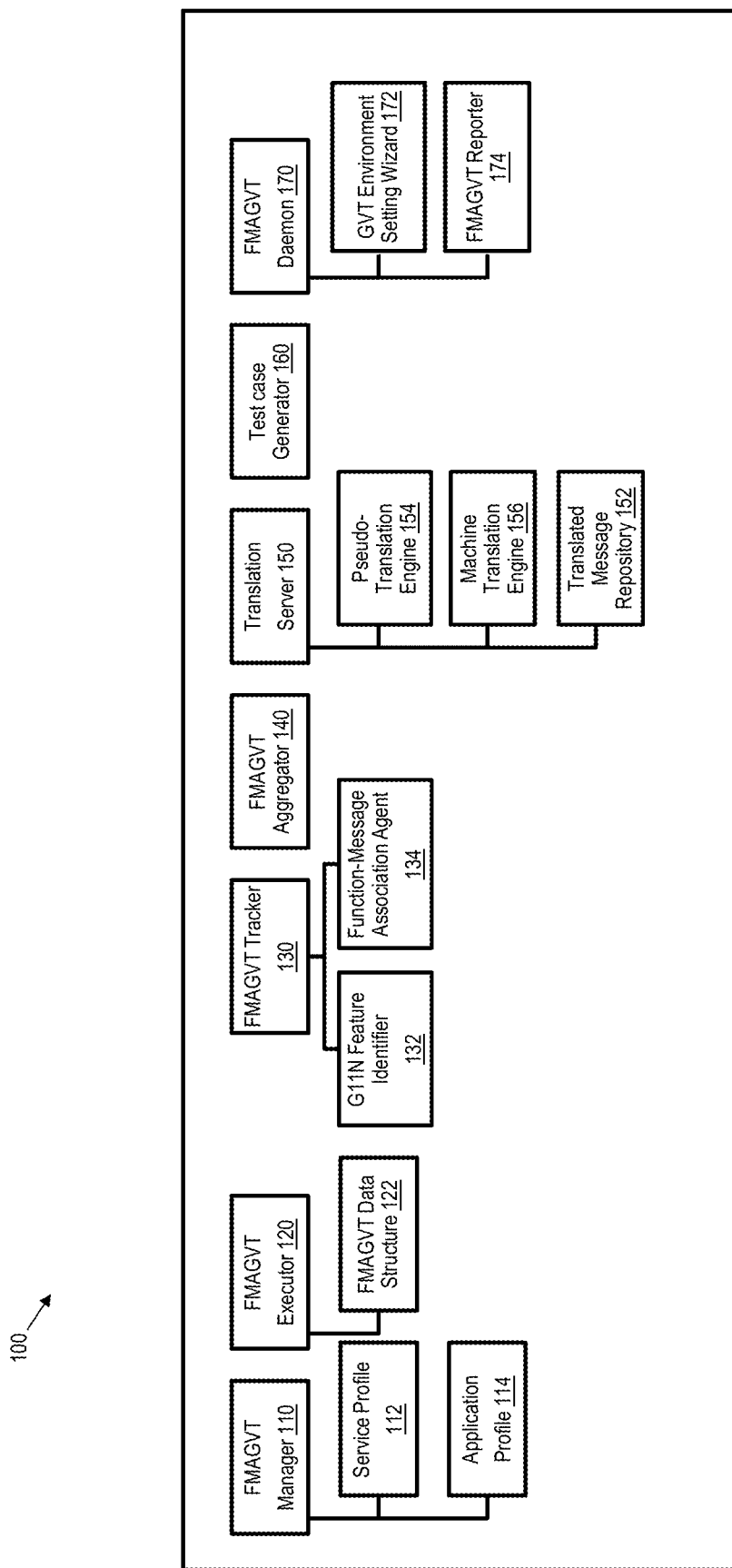
FIG. 5 illustrates an example system for preventing translatability problems by using function-message identifier oriented test case generation according to one or more embodiments of the present invention.

FIG. 5 illustrates an example system 100 for preventing translatability problems by using function-message identifier oriented test case generation according to one or more embodiments of the present invention. The system 100 includes a Function-Message Associated Globalization Verification Test (FMAGVT) manager 110. In one or more examples, the FMAGVT manager 110 provides a user interface (UI) for managing and configuring FMAGVTs for dynamically verifying globalization features in continuous delivery of source code in the IDE 200 or any other source code development platform.

The FMAGVT manager 110 accumulates/obtains information about the computer program being developed. The information is stored as part of a service profile 112 and an application profile 114. In one or more examples, the service profile 112 and the application profile 114 store application name, version, source code repository name, primary language message file directory, translation language list, message encoding (e.g. UTF), pseudo-translation, and machine translation settings. In one or more examples, the service profile 112 and the application profile 114 are combined as part of a single profile. Any combination of the stored one or more of the above parameters in the service profile 112 and the application profile 114 is possible.

For example, the service profile 112 can be a file (database, xml, or plain text) for saving FMAGVT settings. In one or more examples, the FMAGVT manager 110 stores multiple application profiles 114, each corresponding to separate computer programs being developed. Alternatively, or in addition, the each of the multiple application profiles can be corresponding to a different version of the application being developed.

Further, an application profile 114 can be a file (database, xml, or plain text) for saving FMAGVT criteria, settings for a certain computer program product 210. For example, consider that a computer program product 210 X supports 15 languages. The application profile 114 for product X requests the FMAGVT manager 110 to test Japanese and Russian languages (from the 15 supported languages) in a UTF-8 environment with pseudo translation method in each sprint, and to test Simplified Chinese in GB18030 environment with machine translation method. These computer program product specific settings can be customized in other examples.

The system 100 further includes a FMAGVT executor 120. The FMAGVT executor 120 controls operation in specific scopes, levels, and methods in the computer program product 210 being developed. The FMAGVT executor 120 controls the operations according to predefined FMAGVT rules and criteria. Further, the FMAGVT executor 120 facilitates real-time modification of the FMAGVT test case generation. The FMAGVT executor 120 provides a message update analysis report to the one or more developers. In addition, the FMAGVT executor 120 also defines how to use the FMAGVT data to compare translated messages in different languages to determine validity. In one or more examples, the translatability of messages (text that is to be translated) can be tested in multiple layers: uncompiled message vs. compiled messages; input message vs. output message in each sprint. The FMAGVT executor 120 accordingly defines a multilayer message verification algorithm and a FMAGVT data structure 122 to agilely verify messages in different layers.

The FMAGVT data structure 122 facilitates handling (tracking, testing, managing) relationships between functions and messages in the computer program being developed. Here "function" is a subset of computer executable instructions in the computer program product 210 that can be invoked by calling a corresponding "function name." In one or more examples, the FMAGVT data structure 122 includes values of at least the following parameters ProductID, versionID, commandID, functionID, functionName, sourcecodeID, linenumber, MeesgaeBufferSize, messageSET, messageID, encodeingID, supportLang, lastmodifiedtime.

For example, the FMAGVT data structure 122 for a usage function of a "foo" command can be {ProductID=AIX, versionID=72F, commandID=foo, functionID=foo-usage, sourcecodeID=foo.c, lineunmber=55, MessageBufferSize=256, lmessageSET=FOO, messageID=FOOUSAGE, encodingID=UTF-8, supportLang=Japanese, lastmodifiedtime=20170505).

Here, the ProductID indicates the identifier of the computer program product 210 being developed. The versionID indicates an identifier of a version of the computer program product. The commandID indicates an identifier of the function name in the computer program product, while the functionID indicates an identifier of how the function is being called upon. The sourcecodeID indicates the source code file that includes the function, the linenumber indicates a line in the source code file that includes the message that requires translation test. The MessageBufferSize indicates a maximum memory size allocated for the message. Further, the messageSET identifies a set of messages of which the message is a part of Each message is associated with a messageID. The encodingID, supportLang, and the lastmodifiedtime indicate an encoding used for the message text, the language of the text, and the last instance when the message text was modified, respectively. It should be noted that the parameter names listed in the data structure 122 can be different, and also that the data structure 122 can include can include additional parameter values in other examples.

Further, the system 100 includes a FMAGVT tracker 130 that facilitates tracking completion of coding. For example, FMAGVT tracker 130 detects if a source code file foo.c has been modified in the source code repository 300, or if foo.msg has been updated in the message repository 400. In one or more examples, the foo.msg file in the message repository 400 includes all of the messages that are part of the function foo in the source code.

The system 100 further includes a G11N feature identifier 132 for identifying a new added globalization function call (source code name, function name, line # etc.) in a modified source code in the IDE 200. In one or more examples, the G11N feature identifier only detects changes in G11N related function. Further, function-message association agent 134 associates the messageID of the one or more program integrated information (PII) messages with the globalization function that is identified by the G11N feature identifier 132.

The system 100 further includes a FMAGVT aggregator 140 for aggregating the associated function-message variables (function name, message ID, message path, message buffer name, message content in $1^{st}$ language, message content in the $2^{nd}$ language, testing locale environment, etc.) into the FMAGVT data structure 122. Accordingly, the FMAGVT aggregator 140 populates the values in the FMAGVT data structure 122 for each of the functions in the source code. For example, when the function foo is added by the developer, the FMAGVT aggregator creates the corresponding FMAGVT data structure 122: FMAGVT Data (ProductID=X, versionID=72F, commandID=foo, functionID=foo-usage, sourcedocdeID=foo.c, linenumber=55, MeesgaeBufferSize=256; messageSET=FOO, messageID=FOOUSAGE, encodeingID=UTF-8, supportLang=Japanese, lastmodifiedtime=20170505).

Further, the system 100 includes a translation server 150 that translates the aggregated message data from the primary language (first language) of a message into a translated message in a second language. The translation server 150 can use one or more translation services and save the translated messages into a translated message repository 152. The translation server 150 can include multiple translation services such as a pseudo-translation engine 154 and a machine translation engine 156. The translated message repository 152 is a database for saving and managing the translated messages for generating FMAGVT test cases. In one or more examples, the translated messages are generated iteratively using the one or more translation services. In one or more examples, the translated message repository 152 is part of the message repository 400.

A test case generator 160 from the system 100 generates one or more specified test cases based on the FMAGVT settings. For example, a test case can be created as pseudocode shown in Table 1.

TABLE 1

FMAGVTTest {
TestMessage[FMAGVT_Data->MessageBufferSize];
SetlCurrentLocle(LANG, FMAGVT_Data->supportLang)
Categoryopen(FMAGVT_Data)
Copy(TestMessage, CategoryGet(FMAGVT_Data))
Print (TestMessage);}

The FMAGVT settings can be adjusted via a GVT Environment Setting Wizard 162, which can be a user-interface provided to one or more developers to adjust the GVT settings for the computer program product 210. For example, the GVT settings can include the different languages that are supported by the computer program product 210, the translation service(s) to be used, a maximum memory buffer size to use for a message, and the like.

The system 100 further includes a FMAGVT daemon 170 for launching the generated test case for verifying the associated function-message. Subsequently, a GVT test suite can be used to verify if the printed message that is output from the generated test case is valid, for example, in right format, language, encoding, length, etc. The FMAGVT daemon 170 is a background process that is monitoring the development of the new source code. In one or more examples, the FMAGVT daemon 170 determines compliance of the new code with the GVT settings each time a check-in is initiated, and if the new code is to be G11N verified. In one or more embodiments, the verification includes comparing a translatability feature in the new code to globalization specification data sheet (not shown) and a design specification of the computer program product 210 that is being developed.

The system 100 also includes a FMAGVT reporter 174 that sends notifications to the one or more developers and other stakeholders in the development of the computer program product 210. Sending the notification by the FMAGVT reporter 174 can include creating and broadcasting a GVT report to the development team during/after each sprint. The notification can include one or more different types of notifications, such as email, pop-up, or any other user interface that is provided to the development team members.

Figure 6:
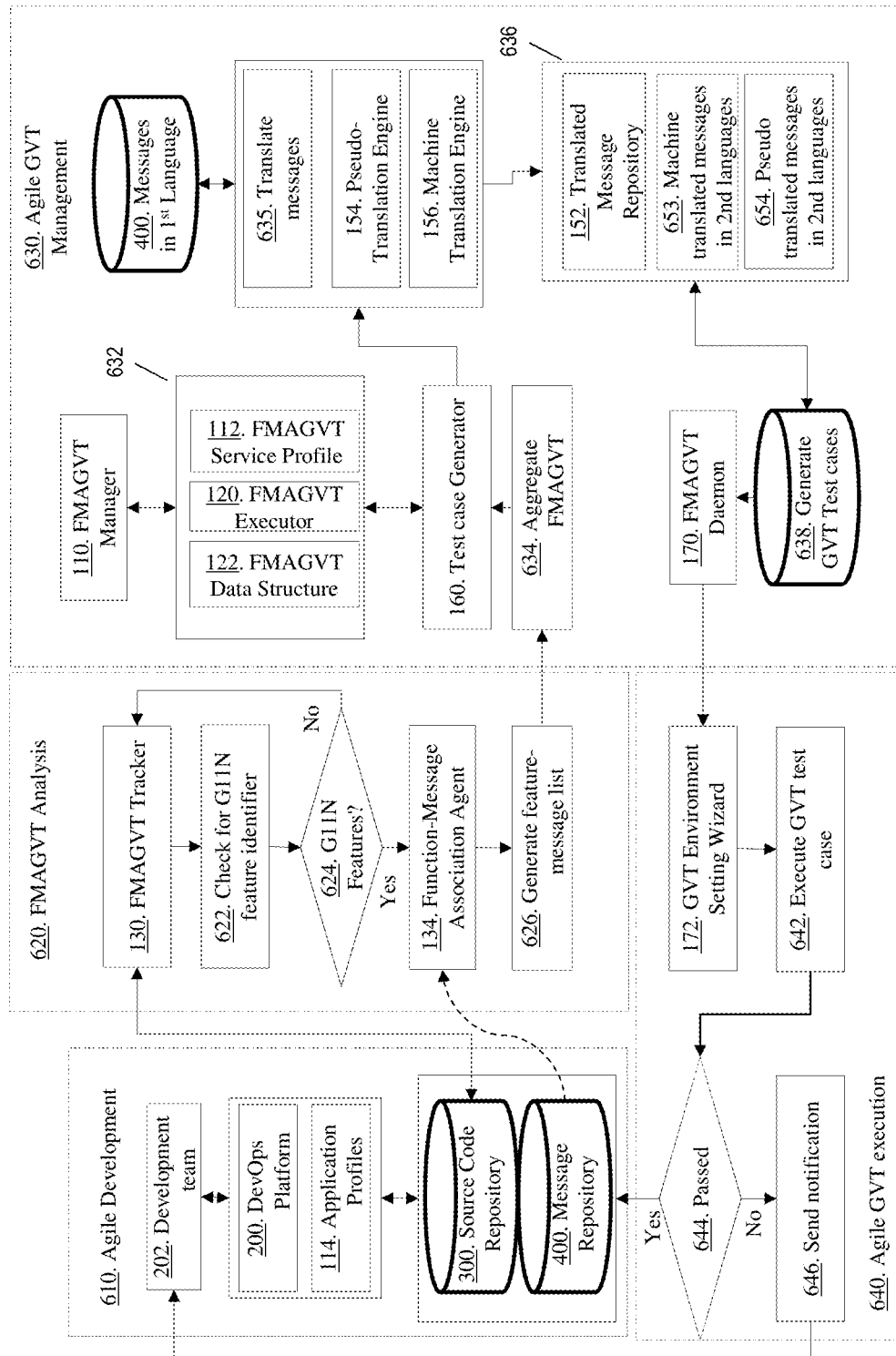
FIG. 6 depicts a dataflow diagram for a method to prevent translatability problems by using a system for function-message identifier oriented test case generation according to one or more embodiments of the present invention.

FIG. 6 depicts a dataflow diagram for a method to prevent translatability problems by using the system 100 for function-message identifier oriented test case generation according to one or more embodiments of the present invention. The method includes a typical agile development process being followed by the development team 202, at 610. Accordingly, the development team 202 uses the DevOps platform, such as the IDE 200, to develop new source code and messages that are part of the computer program product 210. The development team 202 also creates/updates the application profiles 114 associated with the computer program product 210. The source code and the messages are checked in to the source code repository 300 and the message repository 400, respectively.

The method further includes an FMAGVT analysis being performed by the FMAGVT system 100, at 620. The FMAGVT analysis includes the FMAGVT tracker 130 monitoring the source code check in and determining if the checked in source code is associated with a G11N feature using the G11N feature identifier 132, at 622. The G11N feature determination is performed using a design specification and/or a globalization specification sheet 212 associated with the computer program product 210.

If the G11N feature identifier 132 does not detect a G11N feature in the source code, the method continues as a typical agile development process with the source code being checked in to the source code repository 300 and other protocols set by the development team 202, at 624. Alternatively, if one or more G11N features are detected, the function-message association agent 134 generates a feature-message list, at 626. The list includes an association between the message IDs and the identified globalization function. A "globalization function" is a function in the computer program product 210 that is used to change one or more language/locale settings.

The method further includes agile GVT management for generating test cases to verify and/or validate the one or more globalization functions in the source code, at 630. The FMAGVT manager 110 provides the FMAGVT service profiles 112 and data structure 122 for each entry in the feature-message list, at 632. The FMAGVT aggregator 140 aggregates, for each of entry in the feature-message list, the corresponding FMAGVT data structures 122, at 634. Further, the FMAGVT executor 120 is configured to define how to use the FMAGVT data, and how to compare translated messages. For example, the translatability can be tested in multiple layers, un-compiled message vs. compiled messages; input message vs. output message, and the like.

The test case generator 160 initiates translation of the one or more messages via the translation server 150, at 635. The translation is performed using the one or more translation services available, such as the machine translation engine 156 and pseudo translation engine 154. The translation server 150 accesses the messages, using the messageId, from the message repository 400, and passes them through the translation services.

The resulting translated messages are stored in the translated message repository 152, at 636. In one or more examples, separate translated message sets are maintained for each translation service used, for example, a first set for machine translated messages (at 653), and a second set for pseudo-translated messages (at 654). Each set includes translated messages in one or more languages supported by the computer program product 210. "Pseudo translation" mimics the process of translation by replacing one or more characters in the message with predetermined or random characters from the other language into which the message is to be translated.

Once the translations are completed, the test case generator 160 generates one or more GVT test cases, at 638. A GVT test case is a type of test to ensure that the G11N features can handle international support without breaking functionality. The GVT test case ensures proper functionality of the features with all supported languages, cultures, and locale settings.

The method further includes executing the agile GVT test cases, at 640. This includes the FMAGVT daemon using the GVT test settings from the GVT environment setting wizard 172 for executing the test case, at 642. If the test case does not pass, at 644, the FMAGVT reporter 174 sends a notification to the development team 202 indicating that the source code may have to be revised, at 646. If the test case passes, the message repository 400 is updated to indicate that the message passed the tests, at 644. In one or more examples, a notification for the development team 202 is generated in this case also.

Figure 7:
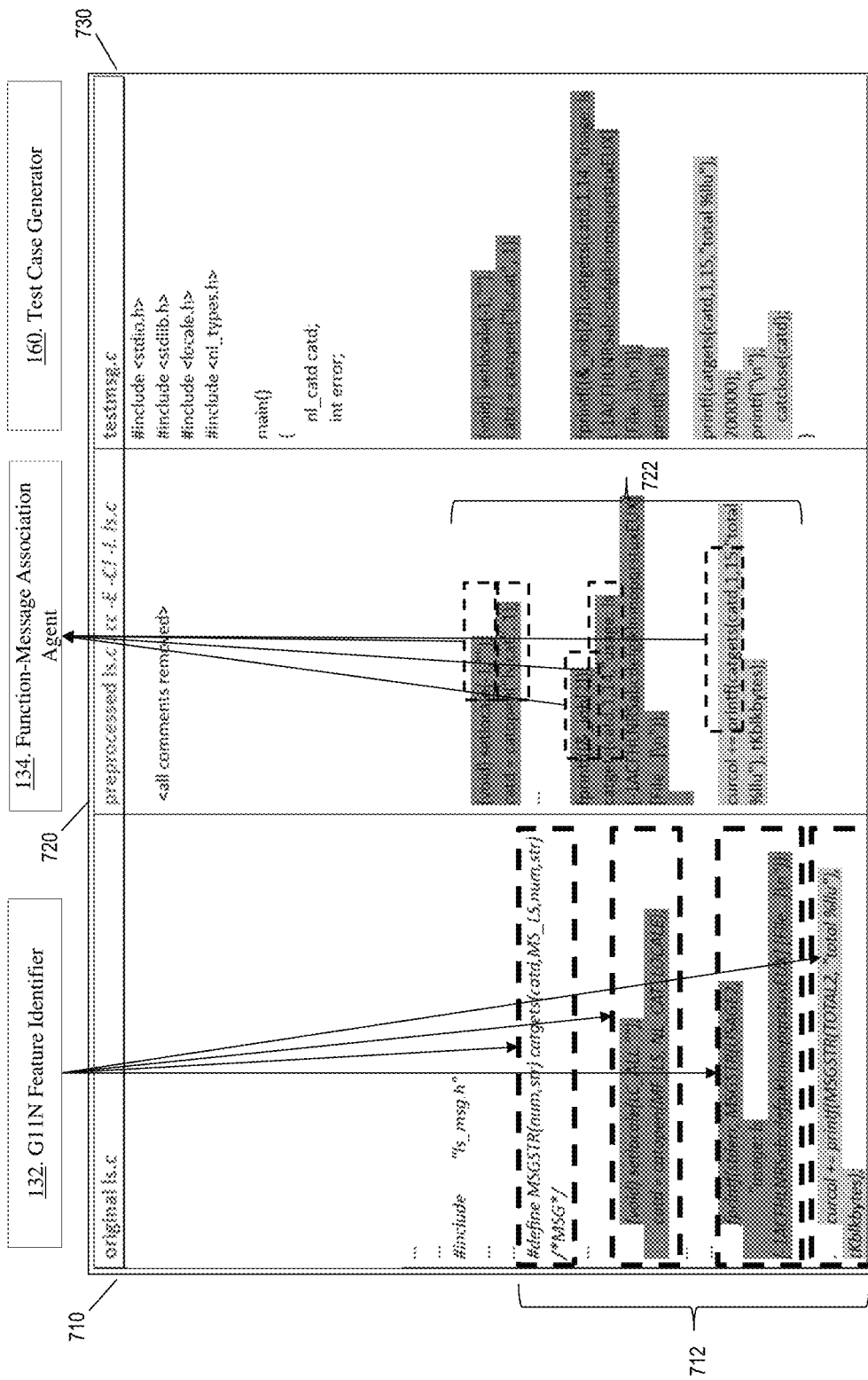
FIG. 7 depicts an example scenario of the execution of a method to prevent translatability problems by using a system for function-message identifier oriented test case generation according to one or more embodiments of the present invention.

FIG. 7 depicts an example scenario of execution of a method to prevent translatability problems by using the system 100 for function-message identifier oriented test case generation according to one or more embodiments of the present invention. It should be noted that the depiction is just one example and that in other scenarios, the execution can vary. In FIG. 7, a source code file 710 includes G11N enabled features in the portions 712. The G11N feature identifier 132 detects these features during check in.

In response, the function-message association agent 134 generates the function-message list and replaces the messages in the source code with corresponding messageIDs 722 as shown in a pre-processed source code 720. The function-message association agent 134 assigns the messageIds 722 to the messages in the source code 710 in the sequence of execution of the messages, for example, when the messages are called in the user interface during execution of the computer program product 210. Further, the test case generator 160 replaces the messageIDs 722 in the source code 710 with corresponding translated messages when generating a test case 730. The test case generator 160 generates test cases for each combination of the locale-language settings that are supported by the computer program product.

Figure 8:
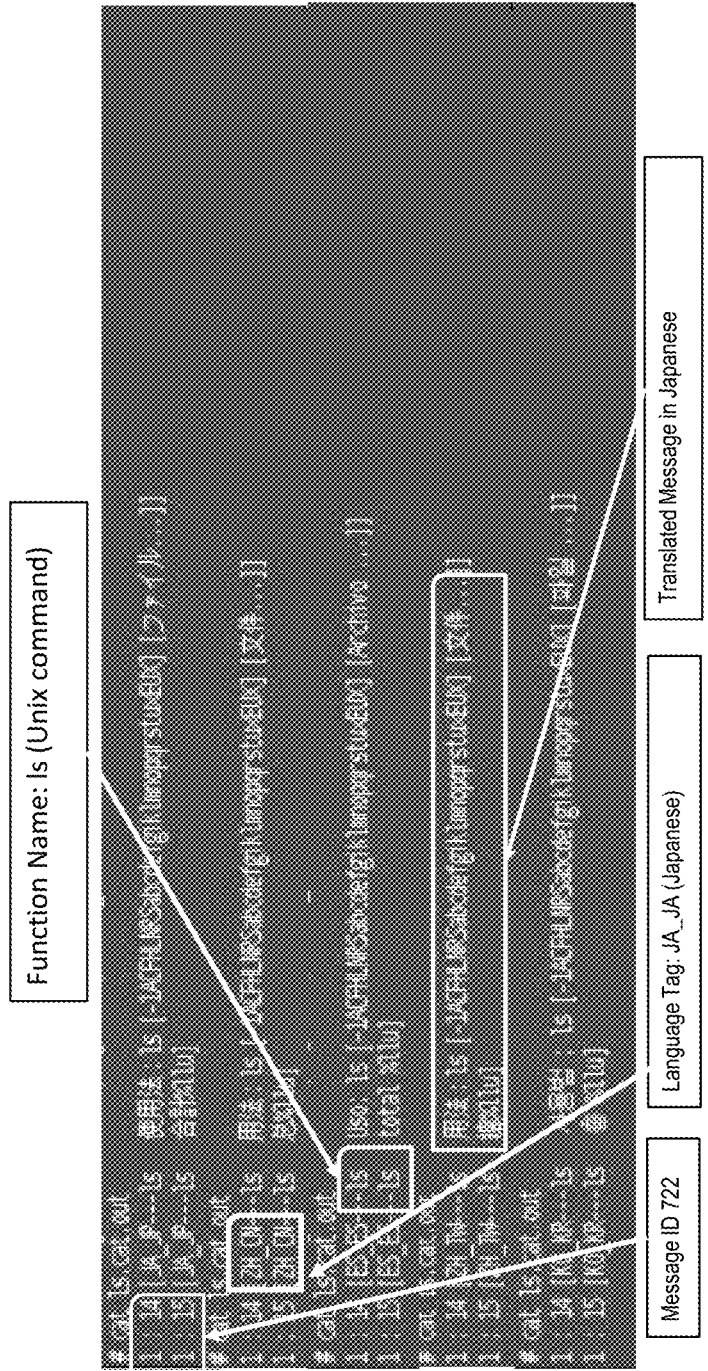
FIG. 8 depicts an example execution of a test case according to one or more embodiments of the present invention.
Figure 9:
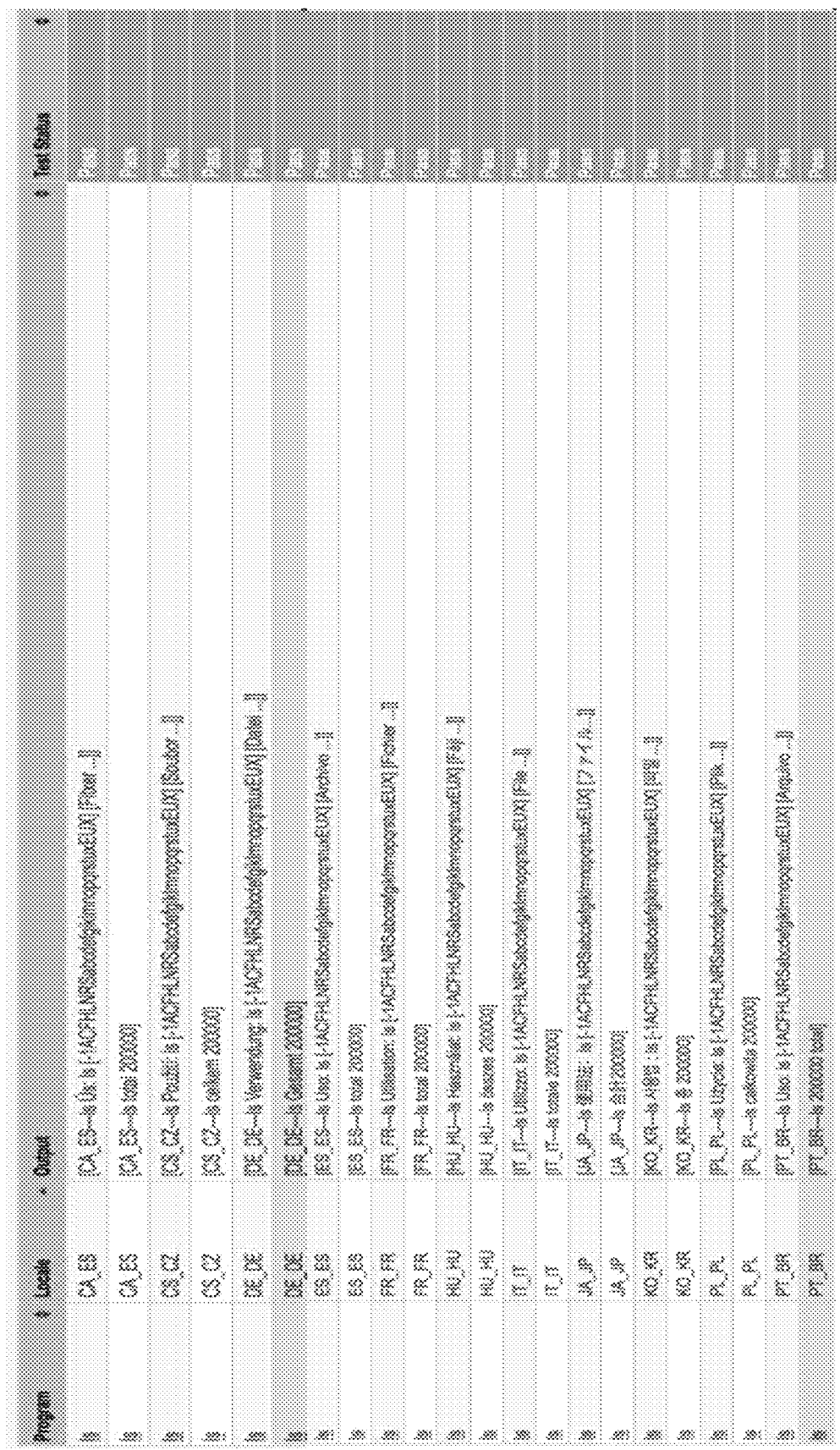
FIG. 9 depicts an execution report of the test cases according to one or more embodiments of the present invention.

FIG. 8 depicts an example execution of the test case 730 according to one or more embodiments of the present invention. The execution example depicts the messageIDs 722 that were assigned to the messages the locale-language tag that is being tested, the name of the function being tested, and the translated message in the translation language being tested. It should be noted that languages other than those depicted here can be used in other execution scenarios. FIG. 9 depicts an execution report of the test cases according to one or more embodiments of the present invention. The execution report indicates the different combinations of the settings for which test cases were generated and executed and the corresponding test results.

Figure 10:
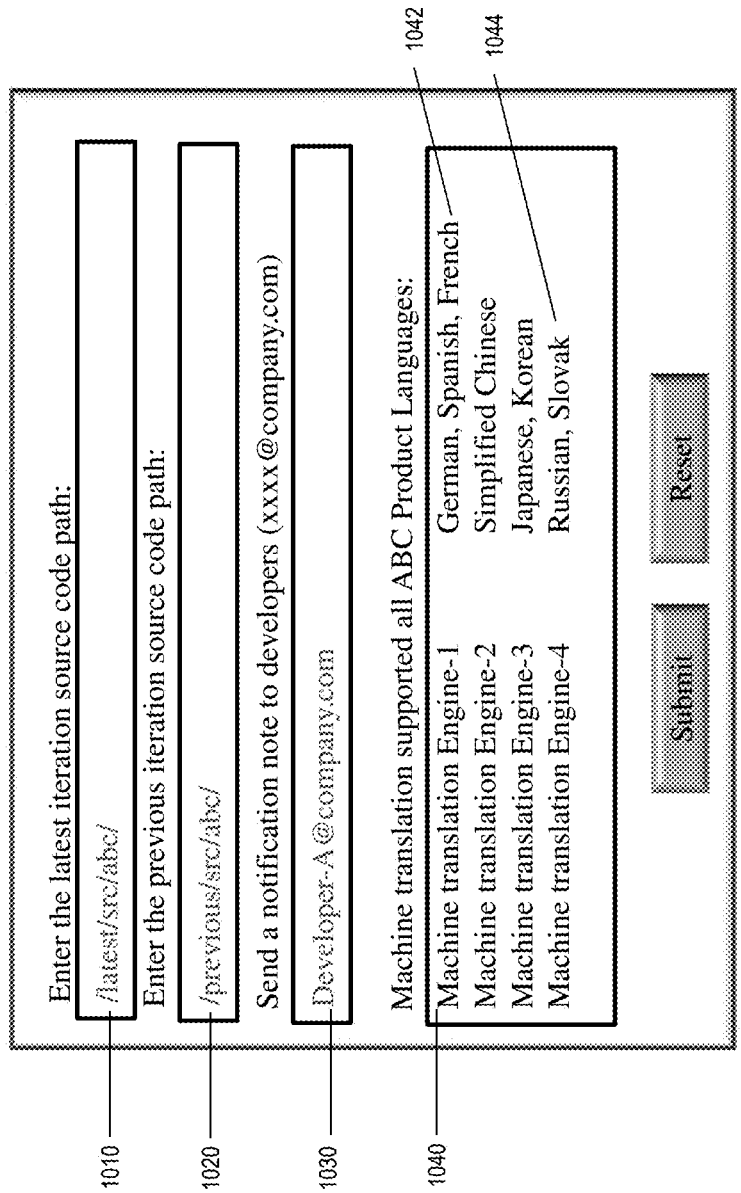
FIG. 10 depicts an example implementation of continuous agile globalization verification testing in development operations according to one or more embodiments of the present invention.

FIG. 10 depicts an example implementation of continuous agile globalization verification testing in DevOps according to one or more embodiments of the present invention. The development team 202 specify a current source code being checked in at 1010. In one or more examples, a previous source code version can also be specified at 1020. In such cases, the FMAGVT manager 110 can determine the differences between the present version being checked in and the previous version to identify the G11N enabled features to be tested. In one or more examples, the development team 202 can also specify where the notifications regarding the GVT tests are to be sent at 1030. Although the example facilitates the development team 202 to specify email addresses, in other examples different notification types can also be specified, such as text messages, instant messages, and the like. Further, the translation services to be used for generating the translated messages for testing can also be specified at 1040. Here, a first translation service is used for translations into a first set of languages at 1042, and a second translation service is used for translations into a second set of languages at 1044. Using different translation services increases reliability and provides better coverage for the tests improving the operation of the system 100 further.

The one or more embodiments of the present invention accordingly facilitate a function-message ID oriented test case generation for seamlessly supporting continuous globalization verification testing in DevOps. In one or more examples, a method includes identifying a newly added globalization function call in a modified source code in IDE. The function call includes at least a source code filename, a function name, and a line number at which the source code for the new function begins in the source code file. The method further includes generating a specified test case based on associated function-message data. Further, the method includes verifying the associated function-message data and creating and broadcasting a GVT report to the development team in each agile development sprint.

The function-message data is generated by associating a program integrated information message identifier with identified globalization function/feature in the source code. The associated function-message data includes at least the variables function name, message ID, message path, message buffer name, message content in first language, message content in a second language, testing locale environment. In one or more examples, the function-message data is aggregated in a specific FMAGVT data structure. The FMAGVT data structure is translated from the first language to the second language via a specified translation service (e.g. a predefined pseudo-translation engine, or/and real machine translation engine(s)), iteratively.

The method also includes defining tracking function-message data changes and generating related test cases dynamically for executing during the present agile development sprint. The tracking can be performed using a multi-layer message verification based on the FMAGVT data structure to agilely verify messages in different layers (e.g.

un-compiled message vs. compiled messages, input message vs. output message) in each sprint.

Accordingly, the one or more embodiments of the present invention enhance globalization enablement efficiency, and accuracy of computer program development systems. The one or more embodiments of the present invention are rooted in computing technology and provide an improvement to computing technology itself.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for function-message ID oriented test case generation for seamlessly supporting continuous globalization verification testing in agile computer program product development, the method comprising:
   identifying a newly added globalization source code in an existing source code, the globalization source code comprising computer executable instructions to output a plurality of messages via a user-interface, the messages being in a first language;
   generating globalization-message data that associates an identifier of the globalization source code with message identifiers of each respective message from the plurality of messages, wherein generating the globalization-message data comprises aggregating the globalization-message data for each of the plurality of messages into a predetermined data structure that comprises at least the identifier, and an entry for each of the plurality of messages, the entry comprising a message identifier, a message content in the first language, and a message content in a second language, wherein the message content in the second language is obtained using a machine translation;
   generating, automatically, a test case for verifying that the globalization source code outputs the messages via the user-interface in the second language using the globalization-message data; and
   creating and broadcasting a test report to a development team, the test report indicating a result of executing the test case.

2. The computer-implemented method of claim 1, wherein the globalization-message data further comprises a source code filename, a function name, and a line number in the source code filename at which the globalization source code begins in the source code filename.

3. The computer-implemented method of claim 1, wherein the globalization source code comprises a plurality of messages, and the method further comprises:
   aggregating the globalization-message data for each of the plurality of messages in a predetermined data structure.

4. The computer-implemented method of claim 3, wherein the predetermined data structure comprises a function name, the message identifier, a message path, a message buffer name, a message content in the first language, a message content in the second language, and a testing locale environment.

5. The computer-implemented method of claim 4, wherein the message content in the second language is obtained using a machine translation and a pseudo-translation.

6. The computer-implemented method of claim 1, wherein the test case is generated using un-compiled source code.

7. The computer-implemented method of claim 1, wherein the test case is generated using compiled source code.

8. The computer-implemented method of claim 1, wherein the newly added globalization function is identified in the modified source code based on a globalization specification sheet of the agile computer program product.

9. A system comprising:
   a memory device; and
   a processor coupled with the memory device, the processor configured to perform a method for function-message ID oriented test case generation for seamlessly supporting continuous globalization verification testing in agile computer program product development, the method comprising:
      identifying a newly added globalization source code in an existing source code, the globalization source code comprising computer executable instructions to output a plurality of messages via a user-interface, the messages being in a first language;
      generating globalization-message data that associates an identifier of the globalization source code with message identifiers of each respective message from the plurality of messages, wherein generating the globalization-message data comprises aggregating the globalization-message data for each of the plurality of messages into a predetermined data structure that comprises at least the identifier, and an entry for each of the plurality of messages, the entry comprising a message identifier, a message content in the first language, and a message content in a second language, wherein the message content in the second language is obtained using a machine translation;
      generating, automatically, a test case for verifying that the globalization source code outputs the messages via the user-interface in the second language using the globalization-message data; and
      creating and broadcasting a test report to a development team, the test report indicating a result of executing the test case.

10. The system of claim 9, wherein the globalization-message data further comprises a source code filename, a function name, and a line number in the source code filename at which the globalization source code begins in the source code filename.

11. The system of claim 9, wherein the globalization source code comprises a plurality of messages, and the method further comprises:
aggregating the globalization-message data for each of the plurality of messages in a predetermined data structure.

12. The system of claim 11, wherein the predetermined data structure comprises a function name, the message identifier, a message path, a message buffer name, a message content in the first language, a message content in the second language, and a testing locale environment.

13. The system of claim 12, wherein the message content in the second language is obtained using a machine translation and a pseudo-translation.

14. A computer program product comprising a computer readable storage medium having stored thereon program instructions executable by one or more processing devices to perform a method for function-message ID oriented test case generation for seamlessly supporting continuous globalization verification testing in agile computer program product development, the method comprising:
identifying a newly added globalization source code in an existing source code, the globalization source code comprising computer executable instructions to output a plurality of messages via a user-interface, the messages being in a first language;
generating globalization-message data that associates an identifier of the globalization source code with message identifiers of each respective message from the plurality of messages, wherein generating the globalization-message data comprises aggregating the globalization-message data for each of the plurality of messages into a predetermined data structure that comprises at least the identifier, and an entry for each of the plurality of messages, the entry comprising a message identifier, a message content in the first language, and a message content in a second language, wherein the message content in the second language is obtained using a machine translation;
generating, automatically, a test case for verifying that the globalization source code outputs the messages via the user-interface in the second language using the globalization-message data; and
creating and broadcasting a test report to a development team, the test report indicating a result of executing the test case.

15. The computer program product of claim 14, wherein the globalization-message data further comprises a source code filename, a function name, and a line number in the source code filename at which the globalization source code begins in the source code filename.

16. The computer program product of claim 14, the method comprising aggregating the globalization-message data for a plurality of messages in a predetermined data structure, wherein the predetermined data structure comprises a function name, the message identifier, a message path, a message buffer name, a message content in the first language, a message content in the second language, and a testing locale environment.

17. The computer program product of claim 16, wherein the message content in the second language is obtained using a machine translation and a pseudo-translation.

18. The computer program product of claim 14, wherein the test case is generated using un-compiled source code.

* * * * *